US009834014B2

(12) United States Patent
Ishikawa et al.

(10) Patent No.: US 9,834,014 B2
(45) Date of Patent: Dec. 5, 2017

(54) PRINTER

(71) Applicant: Brother Kogyo Kabushiki Kaisha, Nagoya-shi, Aichi-ken (JP)

(72) Inventors: Ryosuke Ishikawa, Nagoya (JP); Yasuhiko Murakami, Nagoya (JP); Yushi Kato, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/404,651

(22) Filed: Jan. 12, 2017

(65) Prior Publication Data

US 2017/0203582 A1 Jul. 20, 2017

(30) Foreign Application Priority Data

Jan. 14, 2016 (JP) ................................ 2016-005538

(51) Int. Cl.

| | |
|---|---|
| ***B41J 11/00*** | (2006.01) |
| ***H02P 3/00*** | (2006.01) |
| ***B41J 11/70*** | (2006.01) |
| ***H02P 3/12*** | (2006.01) |
| *B41J 11/24* | (2006.01) |
| *H02P 3/08* | (2006.01) |

(52) U.S. Cl.

CPC .............. *B41J 11/007* (2013.01); *B41J 11/70* (2013.01); *H02P 3/12* (2013.01); *B41J 11/24* (2013.01); *H02P 3/08* (2013.01)

(58) Field of Classification Search

CPC B41J 11/007; B41J 11/70; B41J 11/24; H02P 3/12

See application file for complete search history.

(56) References Cited

U.S. PATENT DOCUMENTS 8,454,111 B2 * 6/2013 Hayashi ................. B41J 11/007 347/14

FOREIGN PATENT DOCUMENTS

JP 2012-250502 A 12/2012

* cited by examiner

*Primary Examiner* — Thinh H Nguyen
(74) *Attorney, Agent, or Firm* — Banner & Witcoff, Ltd.

(57) ABSTRACT

The disclosure discloses a printer including a printing head, a DC motor, an energization control part, a short-circuiting device, a temperature detecting device, and a braking control part. The DC motor is configured to generate a driving force for feed by a feeder. The energization control part is configured to control energization by an energizing device. The short-circuiting device is configured to short-circuit a positive electrode and an negative electrode of the DC motor and brake when deenergized under control of the energization control part. The temperature detecting device is configured to detect a temperature of ambient surroundings. The braking control part is configured to control the short-circuiting device in accordance with the temperature detected by the temperature detecting device, to thereby variably control an operation mode of the braking by the short circuiting.

8 Claims, 13 Drawing Sheets

[FIG. 1]
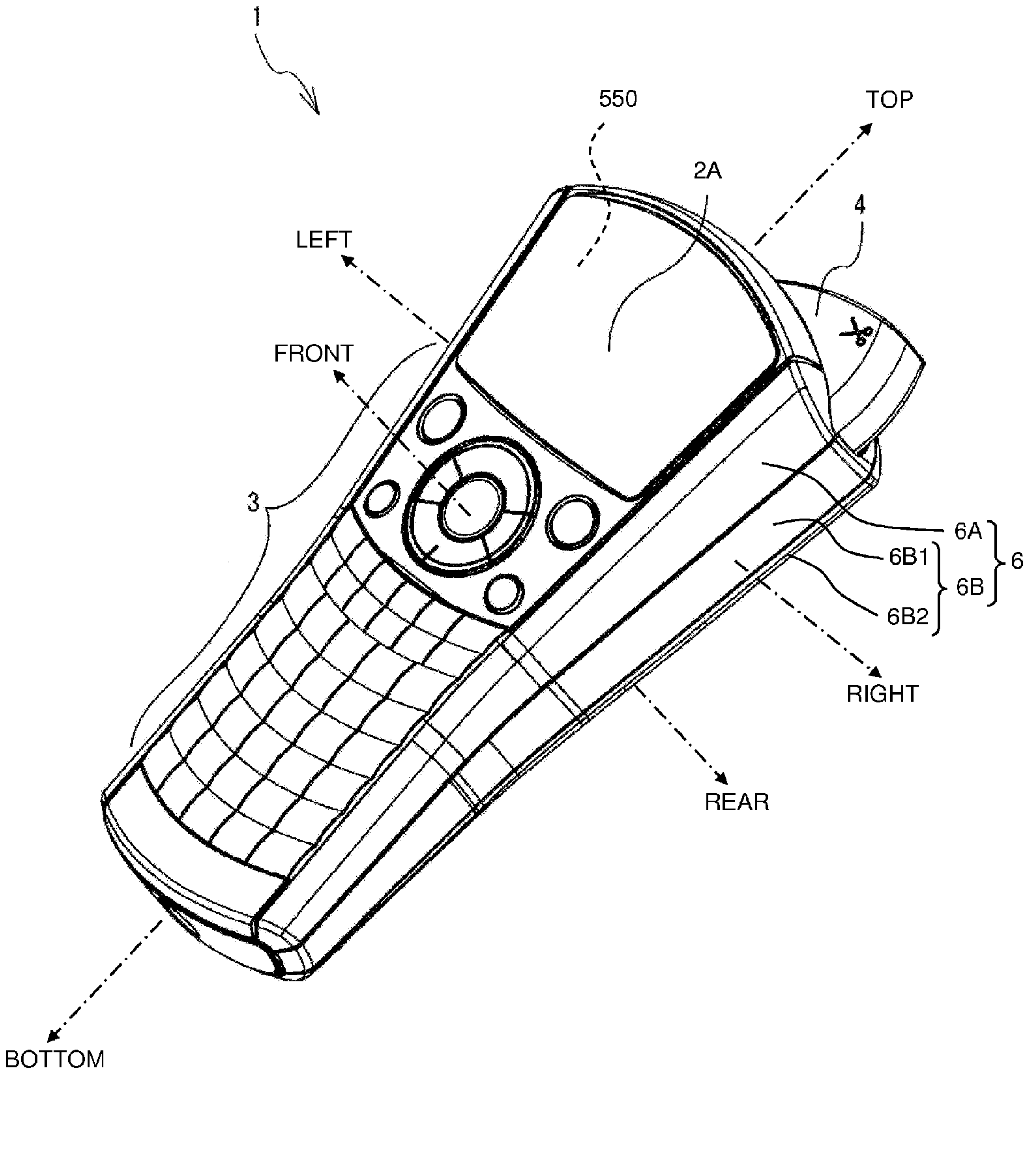

[FIG. 2]
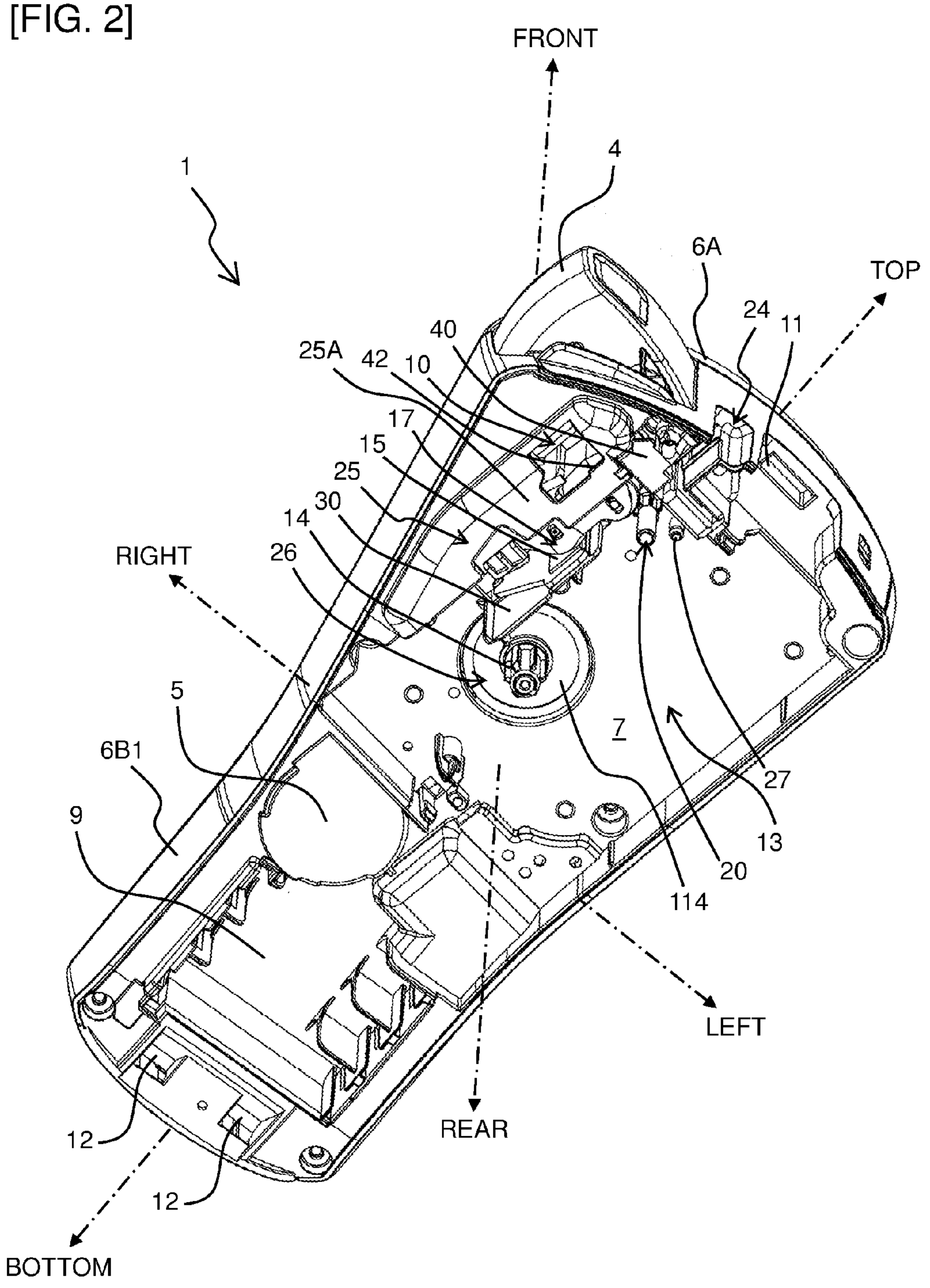

[FIG. 3]
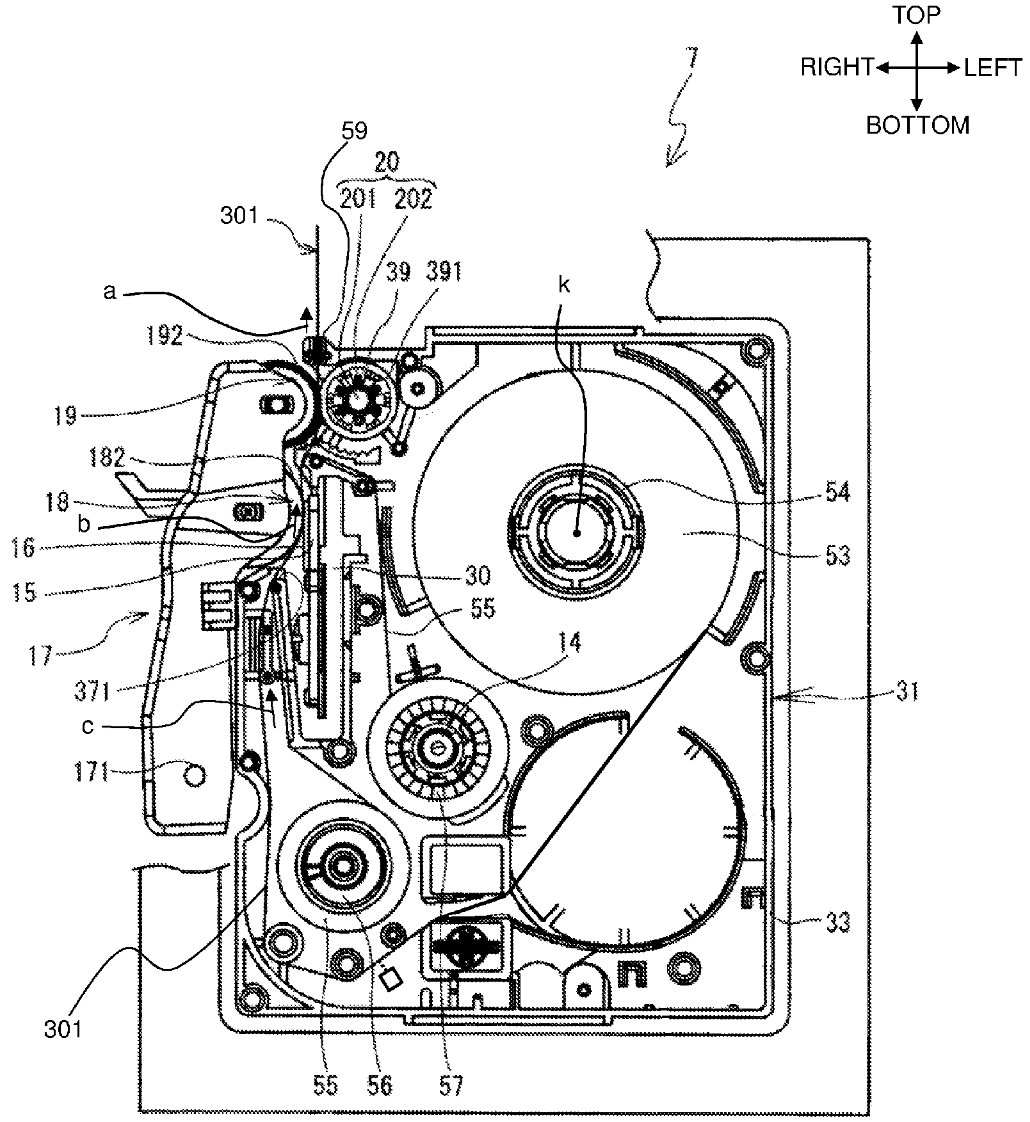

[FIG. 4]
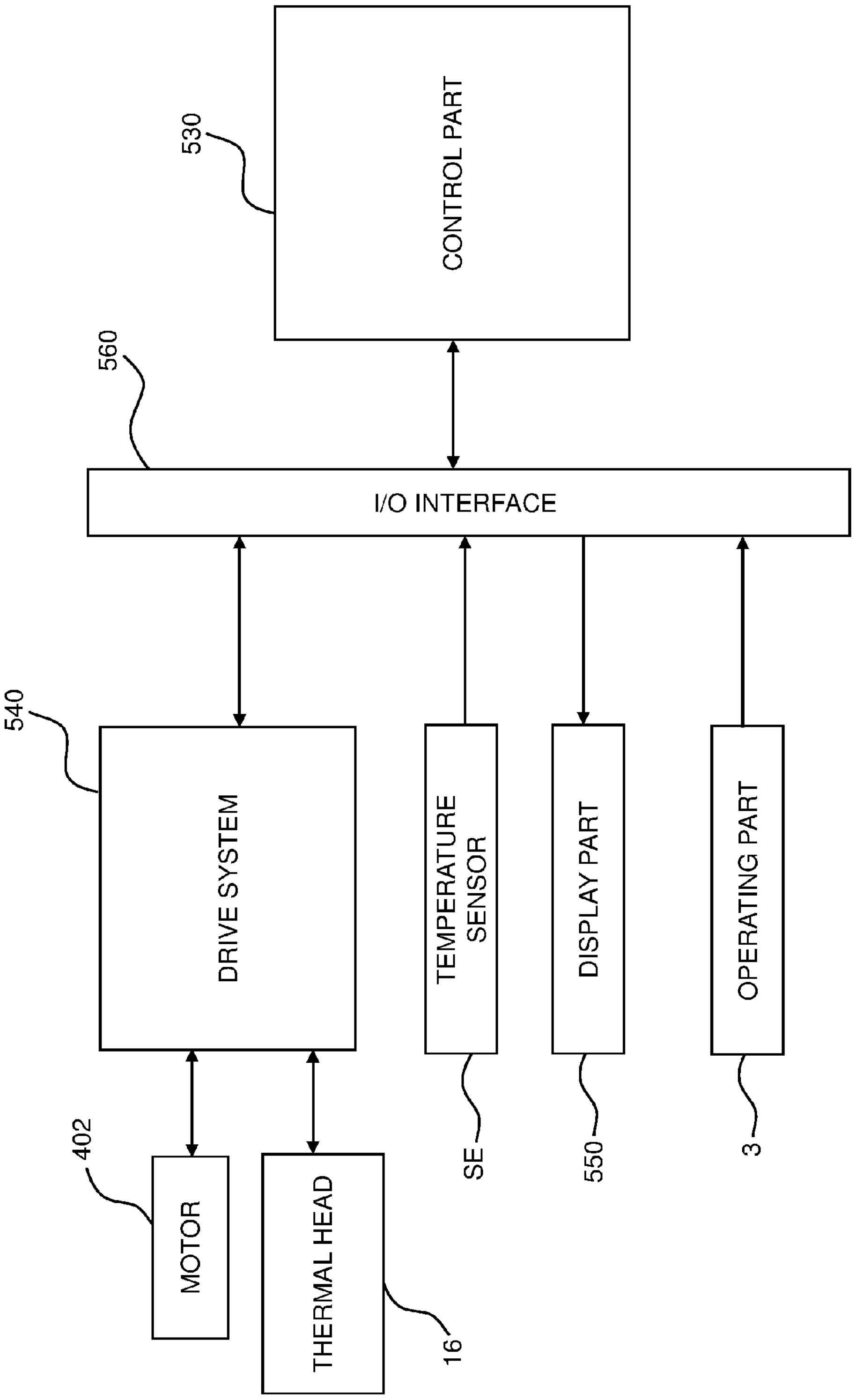

[FIG. 5]
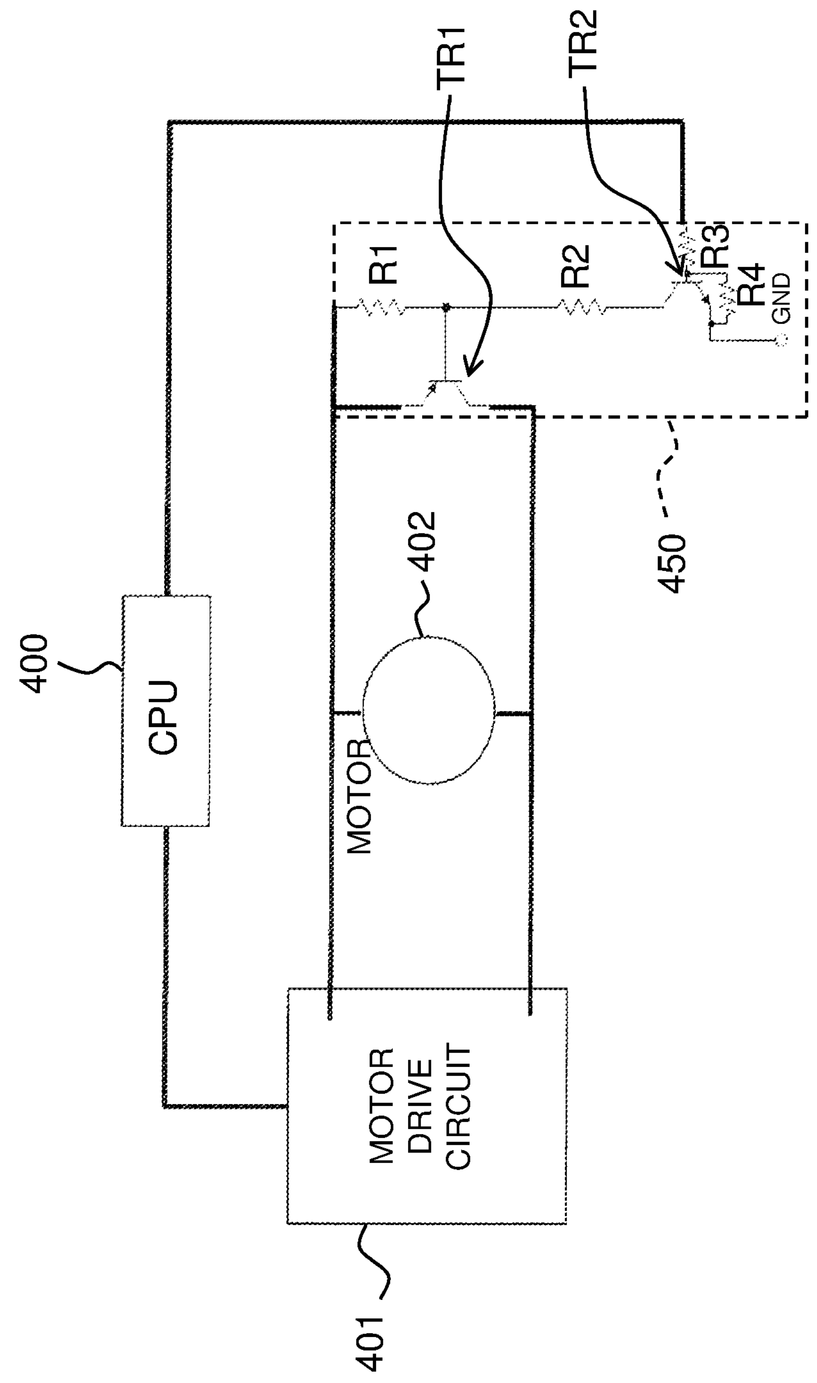

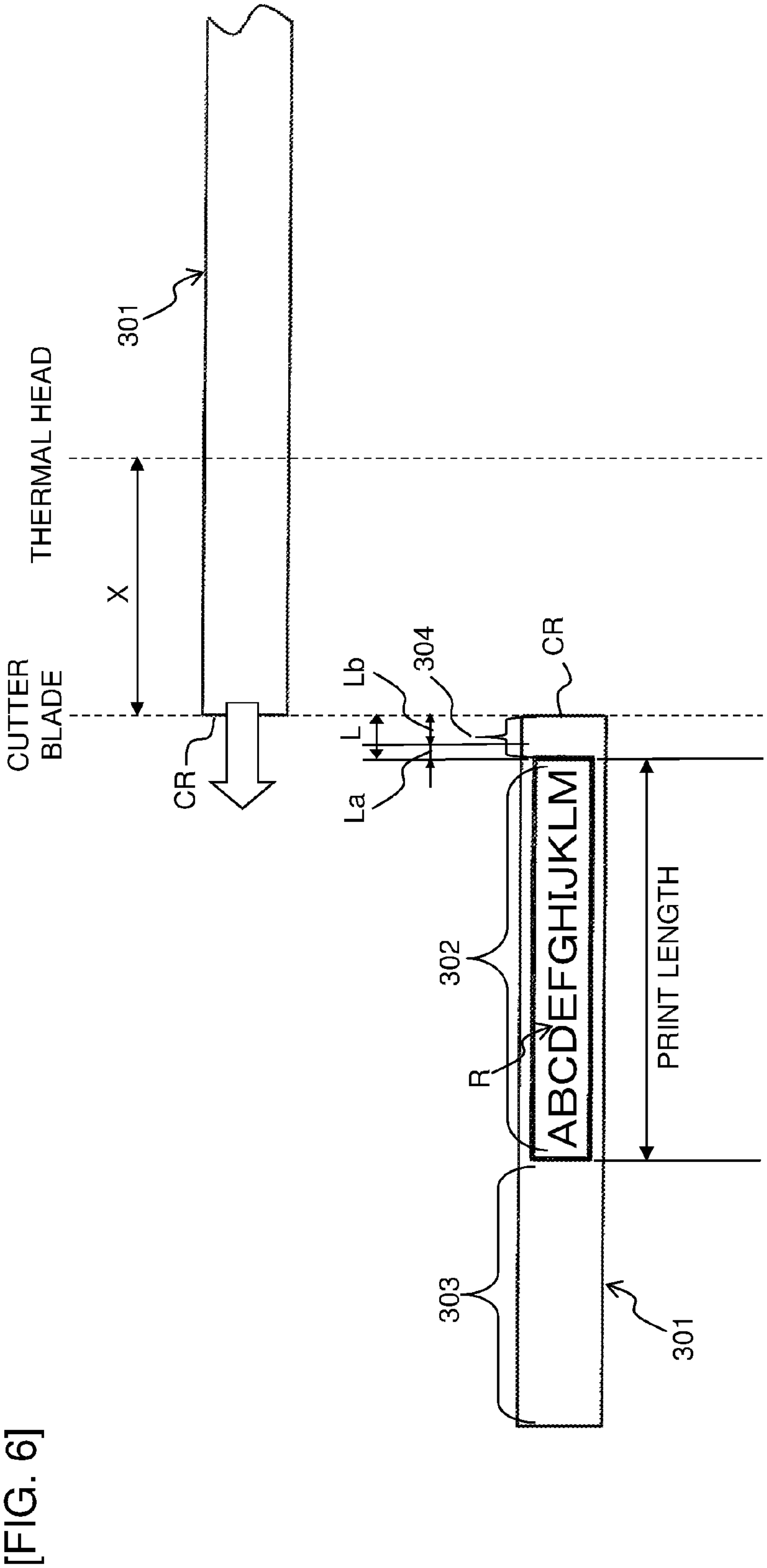
[FIG. 6]

[FIG. 7]
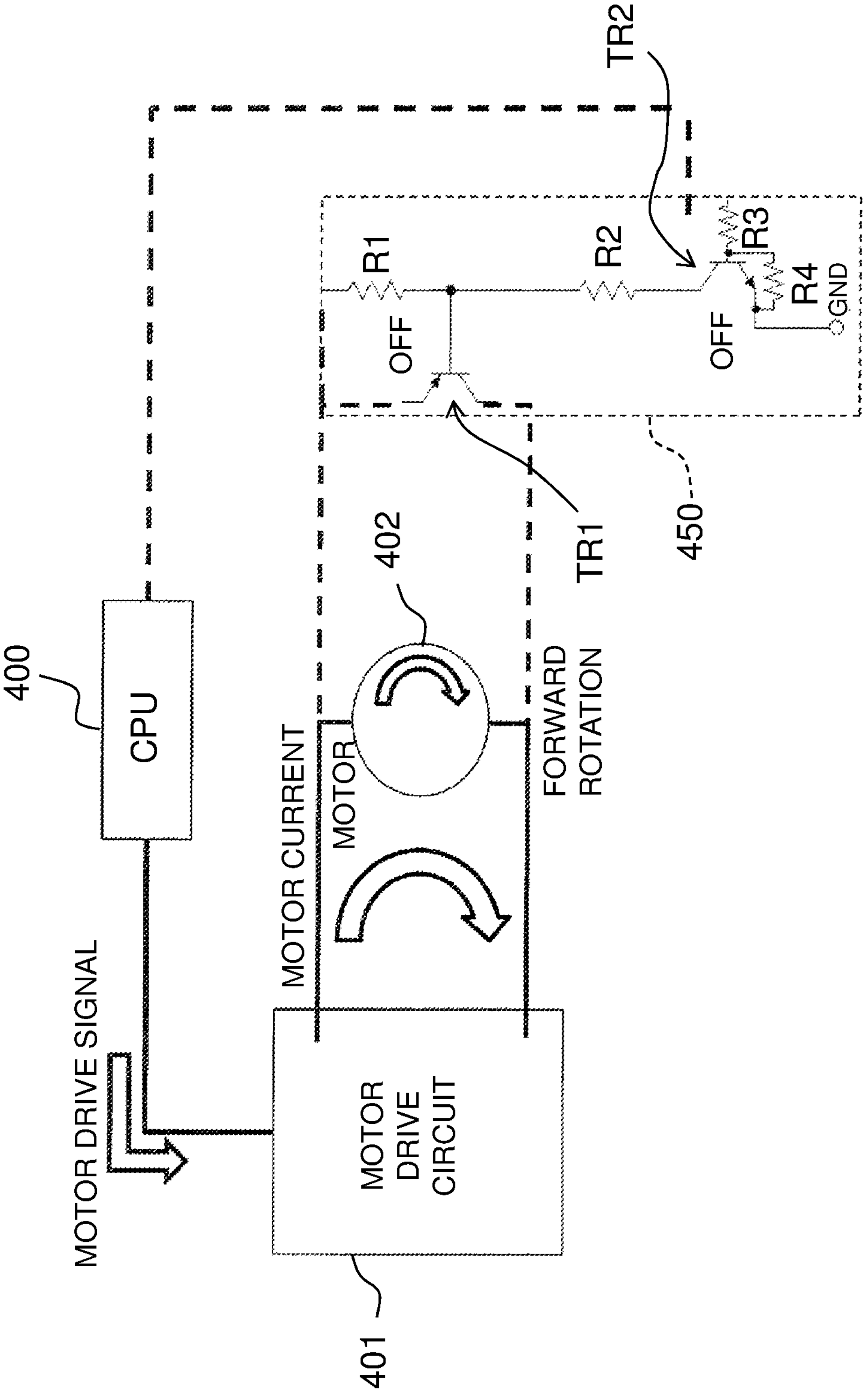

[FIG. 8]
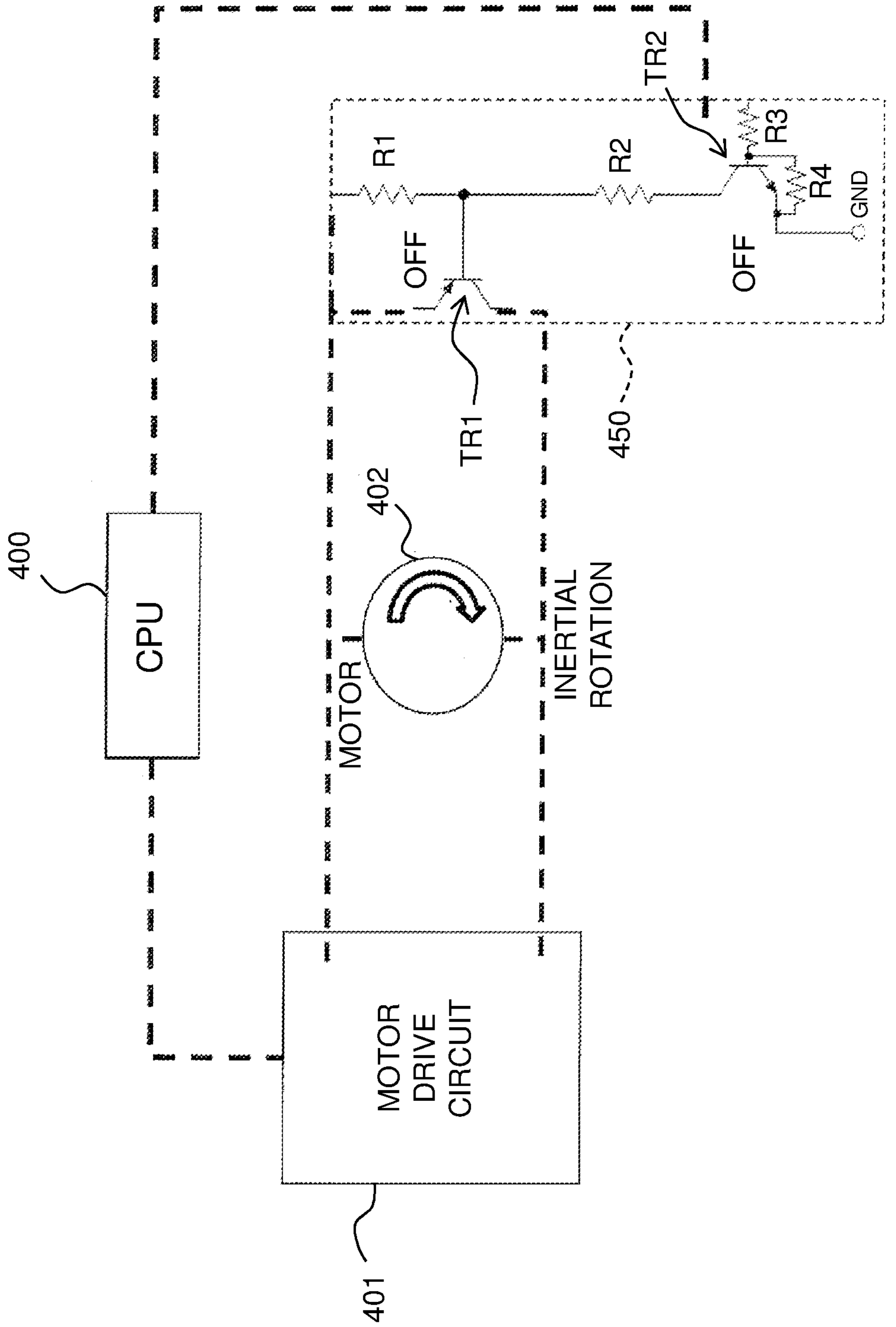

[FIG. 9]
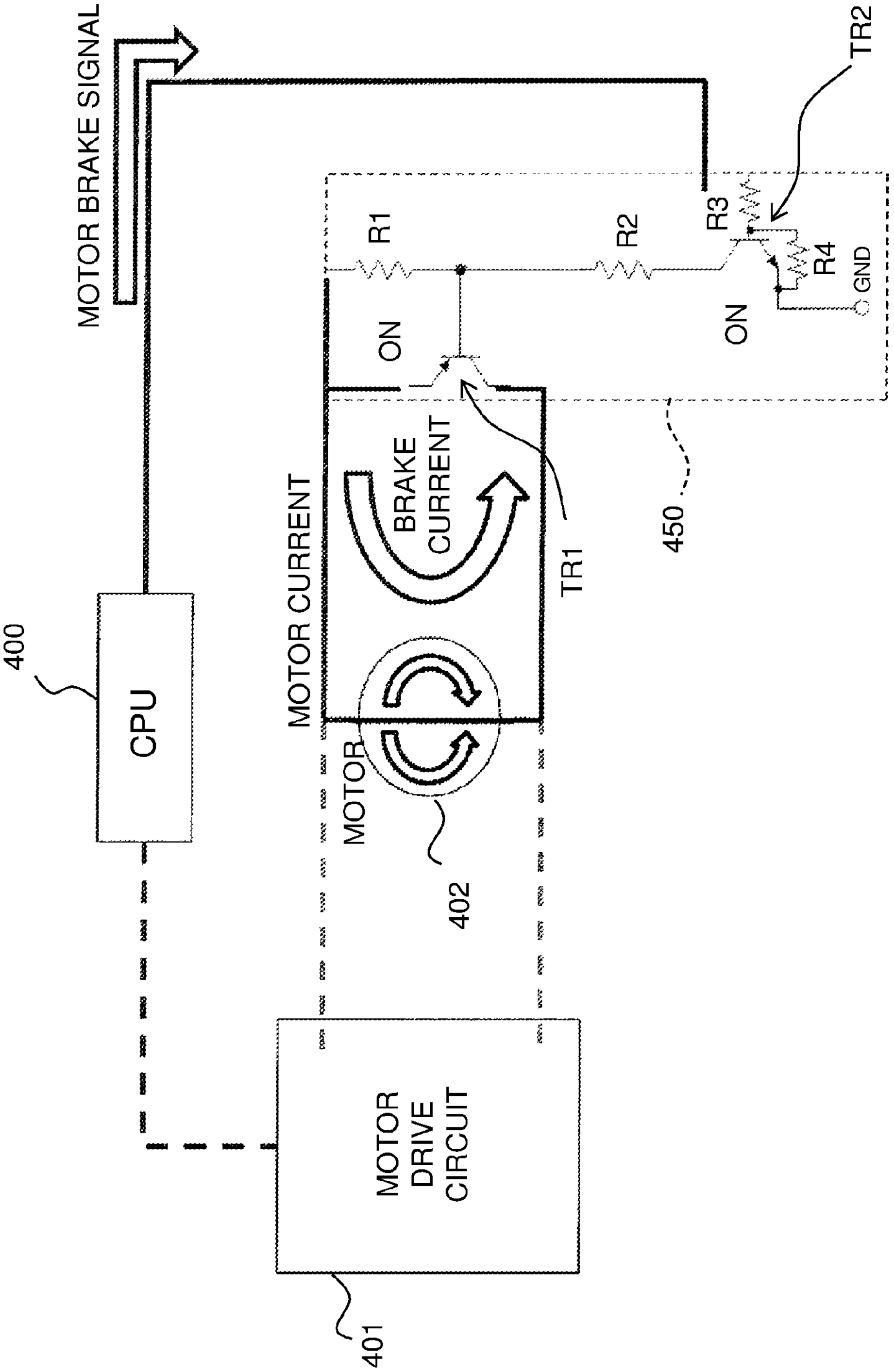

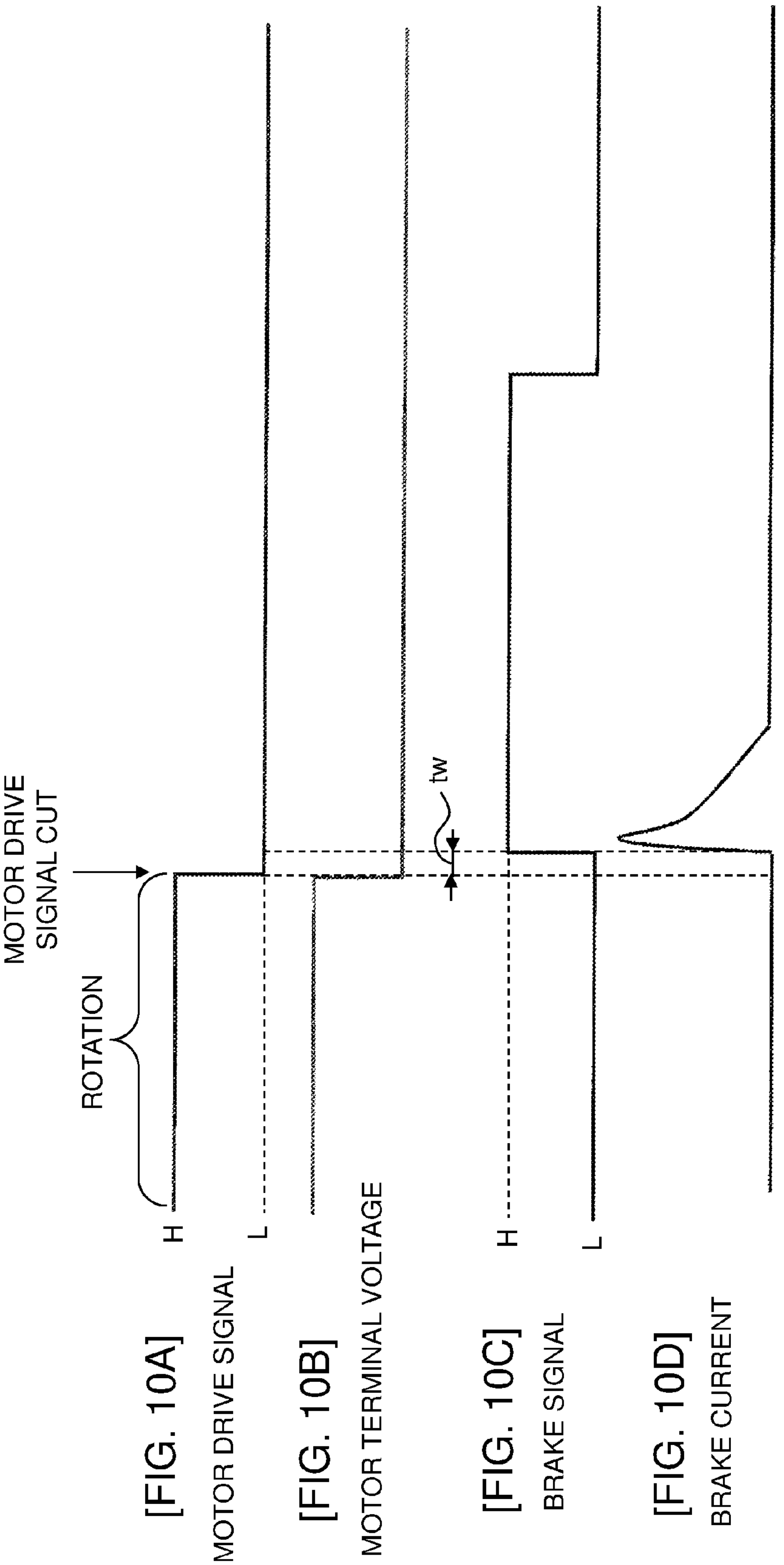
[FIG. 10A] MOTOR DRIVE SIGNAL
[FIG. 10B] MOTOR TERMINAL VOLTAGE
[FIG. 10C] BRAKE SIGNAL
[FIG. 10D] BRAKE CURRENT

[FIG. 11]

| TEMPERATURE ZONE | BRAKING LENGTH (Lb) |
|---|---|
| LESS THAN 10 °C | 0.705mm (5 DOTS) |
| 10 °C TO LESS THAN 15 °C | 0.846mm (6 DOTS) |
| 15 °C TO LESS THAN 20 °C | 0.846mm (6 DOTS) |
| 20 °C TO LESS THAN 25 °C | 0.987mm (7 DOTS) |
| 25 °C TO LESS THAN 30 °C | 0.987mm (7 DOTS) |
| 30 °C TO LESS THAN 35 °C | 0.987mm (7 DOTS) |
| 35 °C OR MORE | 0.987mm (7 DOTS) |

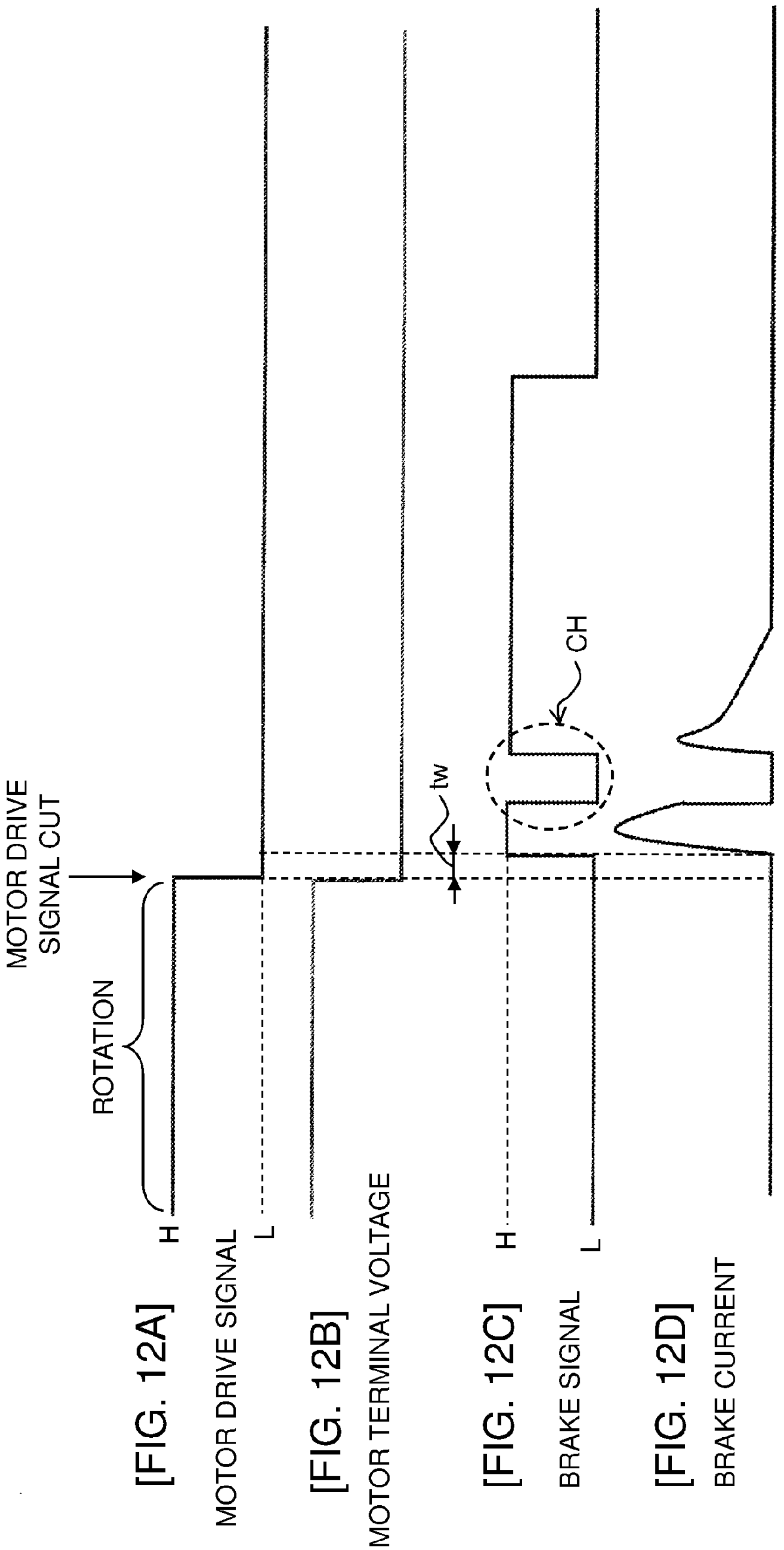
[FIG. 12A]
MOTOR DRIVE SIGNAL
[FIG. 12B]
MOTOR TERMINAL VOLTAGE
[FIG. 12C]
BRAKE SIGNAL
[FIG. 12D]
BRAKE CURRENT

[FIG. 13]
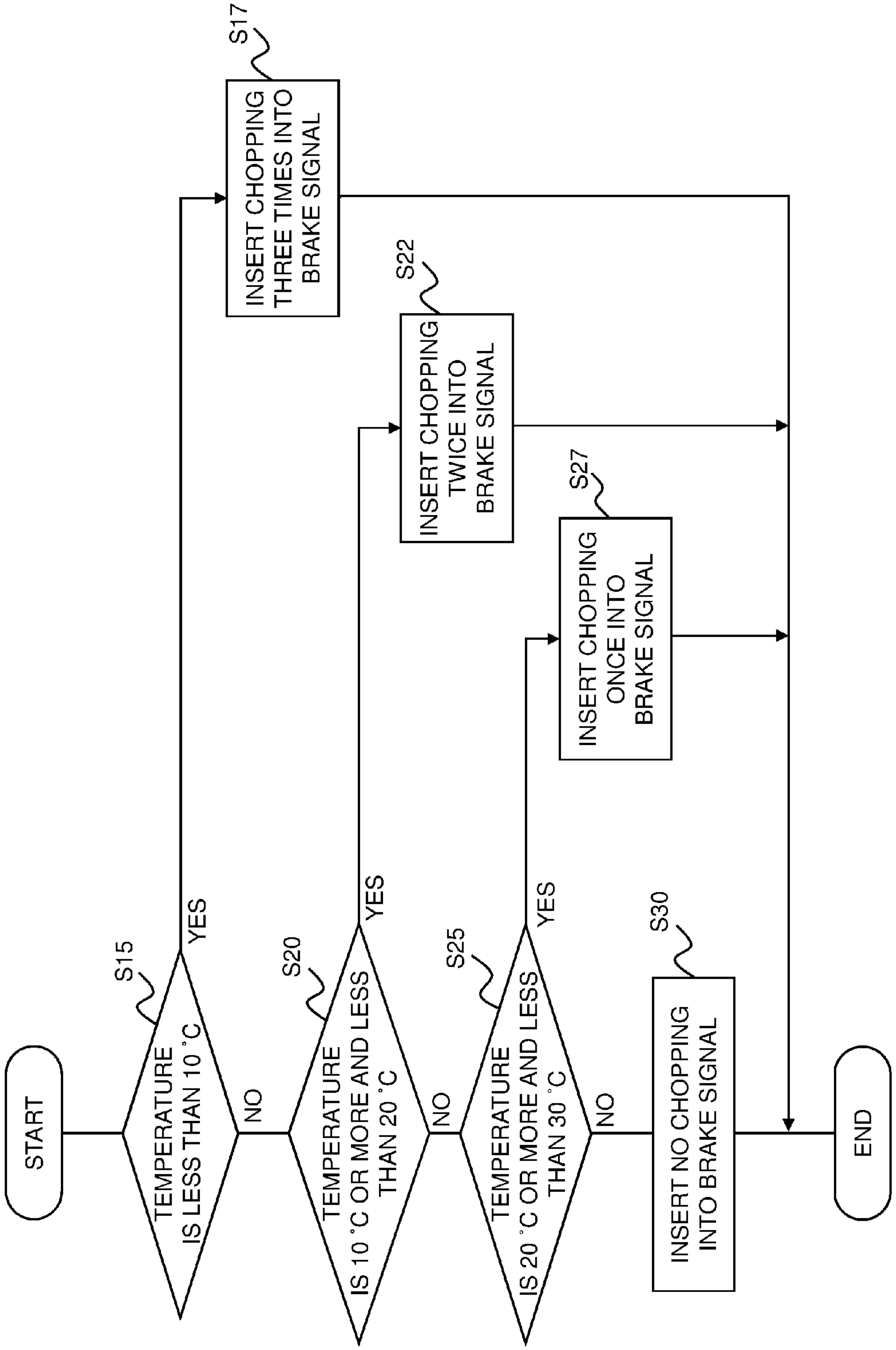

PRINTER

CROSS-REFERENCE TO RELATED APPLICATION

The present application claims priority from Japanese Patent Application No. 2016-005538, which was filed on Jan. 14, 2016, the disclosure of which is incorporated herein by reference in its entirety.

BACKGROUND

Field

The present disclosure relates to a printer performing desired printing on a print-receiving medium.

Description of the Related Art

A printer performing desired printing on a print-receiving medium has hitherto been known. In this printer (an ink-jet head printer), a printing head (a discharge head) performs printing on a print-receiving medium (sheet) that is fed by a feeder (feeding rollers), to form a printed print-receiving medium (printed matter). At that time, the print-receiving medium is fed by a driving force generated by an energized motor. The positive electrode and negative electrode of the motor are short-circuited with the motor deenergized, so that the motor is braked (short braked) so as to fix the position of the print-receiving medium.

The motor (esp. a DC motor) used as a driving source as the above in the printer has a property that the motor slightly continues to rotate by inertia before rotation stops, even if deenergized while being rotationally driven through energization. At that time, since the amount of inertia slightly differs due to printer-specific loads or parts variations, the amount of feeding caused by the inertial rotation varies, with the result that the generated printed matter may have undesirable variations, i.e. a relatively large rear margin (margin appearing further upstream of the upstream end in the transport direction of a print area where print is formed) in some cases or, conversely, a small rear margin in other cases.

In order to avoid this, it is conceivable to apply the prior art braking technique short-circuiting the positive electrode and negative electrode of the motor at the time of the inertial rotation as described above so that a relatively small constant rear margin is obtained (so that the feeding is braked to a specified length for accurate positioning).

However, this case also involves the following problem. That is, in the case of performing the short-circuit braking at the time of the inertial rotation in the above manner, the ambient temperature may affect it. More specifically, when the ambient temperature is relatively high, the entire driving system has a relatively small load (i.e. feeding resistance) during the transport of the print-receiving medium, whereas when the ambient temperature is relatively low, the entire driving system has a large load (feeding resistance) during the transport of the print-receiving medium. In consequence, if certain braking is applied regardless of the temperature, the transport may not be able to be stopped at an expected timing when the ambient temperature is relatively high, resulting in an elongated rear margin. On the contrary, when the ambient temperature is relatively low, the transport may be stopped at an earlier timing than the expected timing, resulting in a shortened rear margin.

SUMMARY

It is therefore an object of the present disclosure to provide a printer capable of keeping the rear margin at a certain length regardless of the temperature level.

In order to achieve the above-described object, according to an aspect of the present disclosure, there is provided a printer comprising a feeder, a printing head, a DC motor, an energizing device, an energization control part, a short-circuiting device, a temperature detecting device, and a braking control part. The feeder is configured to feed a print-receiving medium. The printing head is configured to perform print on a desired print area of the print-receiving medium fed by the feeder. The DC motor is configured to generate a driving force for feed by the feeder. The energizing device is configured to energize the DC motor. The energization control part is configured to control energization by the energizing device. The short-circuiting device is configured to short-circuit a positive electrode and an negative electrode of the DC motor and brake when deenergized under control of the energization control part for the energizing device. The temperature detecting device is configured to detect a temperature of ambient surroundings. The braking control part is configured to control the short-circuiting device in accordance with the temperature detected by the temperature detecting device, to thereby variably control an operation mode of the braking by the short circuiting.

BRIEF DESCRIPTION OF DRAWINGS

FIG. 1 is a perspective view showing an entire configuration of a tape printer in accordance with an embodiment of the present disclosure.

FIG. 2 is a perspective view showing an internal structure of the tape printer with a removable cover removed therefrom and with a cartridge and a battery removed from a cartridge holder and a battery storage part, respectively.

FIG. 3 is a plan view showing an internal structure of the cartridge together with a roller holder, a rib, a heat sink, a thermal head, etc.

FIG. 4 is a block diagram showing a functional configuration of a control system in the tape printer.

FIG. 5 is a circuit diagram showing a major configuration related to a short braking function.

FIG. 6 is an explanatory view showing a schematic transport and printing behavior.

FIG. 7 is a circuit diagram for explaining the content of control at the time of motor-driven tape transport.

FIG. 8 is a circuit diagram for explaining the content of control at the time of motor's inertial rotation.

FIG. 9 is a circuit diagram for explaining the content of control at the time of short-circuit braking of the motor.

FIG. 10A is an explanatory view showing a time series variation of a motor drive signal.

FIG. 10B is an explanatory view showing a time series variation of a motor terminal voltage.

FIG. 10C is an explanatory view showing a time series variation of a brake signal.

FIG. 10D is an explanatory view showing a time series variation of a brake current.

FIG. 11 is an explanatory view showing correspondences between an ambient temperature and a braking distance.

FIG. 12A is an explanatory view showing a time series variation of the motor drive signal in a modification example executing an intermittent braking.

FIG. 12B is an explanatory view showing a time series variation of the motor terminal voltage in the modification example executing the intermittent braking.

FIG. 12C is an explanatory view showing a time series variation of the brake signal in the modification example executing the intermittent braking.

FIG. 12D is an explanatory view showing a time series variation of the brake current in the modification example executing the intermittent braking.

FIG. 13 is a flowchart showing a chopping count setting procedure executed by a CPU included in a control part of the tape printer.

DETAILED DESCRIPTION OF THE PREFERRED EMBODIMENTS

An embodiment of the present disclosure will now be described with reference to the drawings. If there are notes "front", "rear", "left", "right", "top", and "bottom" in the following diagrams, the noted directions refer to frontward, rearward, leftward, rightward, upward, and downward, respectively, in explanations of the description.

<Schematic External Structure of Device>

As shown in FIG. 1, a tape printer 1 is a so-called hand-held type printer grasped by the user's hand. A housing 6 of the tape printer 1 (corresponding to the printer) includes a front cover 6A configuring the device front and a rear cover 6B configuring the device rear. The rear cover 6B includes a rear cover body 6B1 having various mechanisms built therein and a removable cover 6B2 removable from the rear cover body 6B1 when attaching or detaching a cartridge 31 (see FIG. 3 described later) or a battery (not shown).

The front cover 6A has on its upper side a display part 550 for displaying various setting screens, etc. The display part 550 has a front surface covered by a cover panel 2A in the form of e.g. a transparent acrylic plate. An operating part 3 for operating the tape printer 1 is disposed on the lower side of the color panel 2A. The operating part 3 includes keys of letters, symbols, numerals, etc., various function keys, and appropriate buttons. When the user inputs the content to be print-formed through an operation of the operating part 3, corresponding print data is generated and the content thereof is displayed on the display part 550. The rear cover body 6B1 has at its right upper end a cut lever 4 for cutting a print-receiving tape 301 (corresponding to a print-receiving medium: see FIG. 3 described later) on which print is formed as described above.

<Internal Structure of Device>

An internal structure of the tape printer 1 will be described with reference to FIG. 2. As shown in FIG. 2, a frame 13 molded of a resin for example is arranged inside the front cover 6A and the rear cover body 6B1. The frame 13 has at its rear upper portion a recessed cartridge holder 7 that is rectangular in a planar view for attaching and detaching a cartridge 31 (see FIG. 3 described later).

A motor storage part 5 is disposed on the lower side of the cartridge holder 7, for storing a motor 402 (see FIG. 4 described later) that is a DC motor. A battery storage part 9 for storing a battery is disposed on the further lower side of the motor storage part 5

The frame 13 has at its upper portion a discharge slit 24 for discharging the print-receiving tape 301 (see FIG. 3 described later) to the exterior. The frame 13 has a roller holder 17 disposed at the upper right thereof. A plate-shaped synthetic resin plate part 25 is disposed on the rear side of the roller holder 17, so as to cover the roller holder 17. The plate part 25 has at its upper portion a protrusion insertion port 10 that is an opening. The rear cover body 6B1 has a lock hole 11 disposed at an upper end thereof and has two lock holes 12 disposed at a lower end thereof.

The frame 13 has a concaved gear recess 26 formed at a substantial center thereof. A gear (not shown) is disposed in the gear recess 26 such that teeth of the gear are covered by a concealment umbrella part 114 so as not to be exposed. A ribbon winding shaft 14 for winding an ink ribbon 55 (see FIG. 3 described later) stands on the rear side of the gear.

A rib 30 stands on the right side of the ribbon winding shaft 14. The rib 30 has on its right side surface a heat sink 15 that is a rectangular radiating plate. A roller shaft 20 stands between the rib 30 and the discharge slit 24. A raised part 27 stands on the left side of the roller shaft 20. The raised part 27 is fitted into a recessed part (not shown) of the cartridge 31 to position the cartridge 31 in the front-rear direction.

The frame 13 has in the vicinity of the discharge slit 24 a guide holder 40 storing therein a cutter holder (not shown) with a cutter blade (corresponding to a cutter) not shown.

The frame 13 has a rib 42 integrally formed therewith in the vicinity of the discharge slit 24. The rib 42 formed on the right side of the discharge slit 24 extends vertically from a planar rear surface 25A of the plate part 25.

<Cartridge Internal Structure>

An internal structure of the cartridge 31 will be described with reference to FIG. 3. As shown in FIG. 3, a ribbon spool 56 with the ink ribbon 55 wound therearound is rotatably arranged inside a cartridge case 33 at its lower right. The ink ribbon 55 fed out from the ribbon spool 56 is guided toward a cartridge opening 371.

A ribbon take-up spool 57 is rotatably arranged diagonally adjacent to the ribbon spool 56 on its upper left side. The ribbon take-up spool 57 pulls out the ink ribbon 55 from the ribbon spool 56 and takes up the ink ribbon 55 consumed by printing of letters or images. The cartridge 31 has at its upper left a print-receiving tape roll 53 (designated as a simple circle in a simplified manner although it is originally spiral). The print-receiving tape roll 53 is a roll obtained by winding the print-receiving tape 301 on a reel 54 with an axis k extending in a direction (vertical to the paper of FIG. 3) orthogonal to the tape longitudinal direction. The print-receiving tape 301 is a print-receiving material superimposed on the ink ribbon 55 so that print is formed on a surface of the print-receiving tape 301 by a heat transfer of ink.

The roller holder 17 of an arm shape having a platen roller unit 18 and a discharge roller unit 19 is disposed swingably in the left-right direction around a shaft support 171 on the right side of the cartridge 31 mounted in the cartridge holder 7. When the removable cover 6B2 is attached, the roller holder 17 moves toward the cartridge 31 due to a protrusion (not shown). As a result, the platen roller unit 18 and discharge roller unit 19 disposed on the roller holder 17 move to a print position (position designated in FIG. 3).

The platen roller unit 18 is disposed on the right side of the heat sink 15. A platen roller 182 (corresponding to a feeder) and a platen roller gear (not shown) are disposed in the platen roller unit 18. The platen roller 182 is disposed at a position facing a thermal head (corresponding to a printing head) disposed on a right side surface of the heat sink 15.

A thermal head 16 comprises a plurality of heat generating elements and forms desired print on a desired print area 302 (see FIG. 6 described later: whose length is variable in accordance with the print length) of the print-receiving tape 301 transported by a discharge roller 192, the platen roller 182, etc. A platen roller gear is engaged with a gear (not shown) disposed on the front side of the frame 13 so that rotation of the platen roller gear powered from the motor 402 causes the platen roller 182 to rotate. As a result, when the platen roller unit 18 moves to the print position, the platen roller 182 feeds, by its rotation, the print-receiving tape 301 toward the discharge roller unit 19 while pressing the print-receiving tape 301 and the ink ribbon 55 against the thermal head 16.

The discharge roller unit 19 comprises the discharge roller 192 and a discharge roller gear (not shown). The discharge roller 192 is disposed at a position facing the roller shaft 20 and transports the print-receiving tape 301 along a transport path (see arrows a, b, and c) extending toward the discharge slit 24. The roller shaft 20 includes a cylindrical portion 201 shaped into a cylinder and six ribs extending radially outwardly from the outer circumference of the cylindrical portion 201. The roller shaft 20 is fitted into a shaft hole 391 of a feeding roller 39 disposed on the cartridge 31 so as to rotatably support the feeding roller 39.

The discharge roller gear is engaged with a gear (not shown) disposed on the front side of the frame 13 so that rotation of the discharge roller gear powered from the motor 402 causes the discharge roller 192 to rotate. As a result, when the discharge roller unit 19 moves to the print position, the discharge roller 192 presses the print-receiving tape 301 against the feeding roller 39 rotatably supported on the roller shaft 20. This allows the print-receiving tape 301 on which print is formed by the thermal head 16 as described above to be discharged from a discharge port 59. The subsequent transport path of the print-receiving tape 301 is such that the print-receiving tape 301 is transported and guided to the discharge slit 24 by the discharge roller 192, etc. and is discharged from the discharge slit 24 to the exterior of the taper printing device 1. The user then operates the cut lever 4 so that the print-receiving tape 301 is cut by the cutter blade (not shown). The print-receiving tape 301 is printed and cut as described above so as to produce a printed tape (in other words, a printed print-receiving tape 301; hereinafter referred to appropriately as "printed tape 301"; see FIG. 6 described later).

<Functional Structure of Control System>

FIG. 4 shows a functional configuration of a control system in the tape printer 1.

Referring to FIG. 4, the tape printer 1 comprises a control part 530 that includes for example a CPU 400 (see FIG. 5 described later) or a microprocessor (not shown in particular) having a RAM and a ROM). The control part 530 connects via an I/O interface 560 to a drive system 540, the display part 550, the operating part 3, and a temperature sensor SE (a temperature detecting device) detecting the ambient temperature. The drive system 540 includes a motor drive circuit 401 (an energizing device; see FIG. 5, etc. described later) energizing the motor 402 generating a driving force for the transport by the platen roller 182, and a thermal head drive circuit (not shown) energizing the thermal head 16.

<Energization Control of Thermal Head>

Description will be given of energization control of the thermal head 16 by the thermal head drive circuit. The thermal head 16 comprises a plurality of heat generating elements (not shown) as described above, that are arrayed in the direction orthogonal to the transport direction. The plurality of heat generating elements form dots corresponding to printing data on printing lines of the print-receiving tape 301, to perform printing. Specifically, the control part 530 generates the printing data for forming dots by the heat generating elements, from string information for example acquired by the operator's operation via the operating part 3, etc. More specifically, based on an input string and on a dot pattern stored in advance in a CG-ROM (not shown), etc. within the control part 530, the control part 530 generates printing data (image data composed of dot-by-dot data) to be printed and divides the printing data into lines printed by the heat generating elements arrayed on the thermal head 16. For example, if the printing resolution is set to 180 dpi, line printing data divided into 180 lines per inch is generated. Based on the line printing data from the control part 530, the thermal head drive circuit supplies a drive signal to the thermal head 16 to control the drive mode of the thermal head 16.

Detailed description will be given of a process through which dots are formed on the printing lines of the print-receiving tape 301 by energizing the thermal head 16. As used herein, the printing line refers to a line on which a row of dots are formed in the width direction of the print-receiving tape 30 by energizing a row of heat generating elements during one printing cycle and lies at each interval that is obtained by dividing the unit length of the print-receiving tape 301 in the transport direction by the resolution. The one printing cycle is a time needed to form a row of dots on the print-receiving tape 301 in its width direction and is made up of: "preliminary heating 1" time for compensating for the heat capacity shortage of the thermal head 16 at the time of print start; "preliminary heating 2" time for raising the temperature of the corresponding heat generating elements up to a predetermined temperature (hereinafter, referred to as an ink melt required temperature, which is 90° C. for example) enabling the heat transfer (i.e., enabling an ink layer of the ink ribbon 55 to be melted); and "main heating" time for keeping the temperature of the corresponding heat generating elements at the ink melt required temperature. The length of the one printing cycle varies in accordance with the resolution and on the feeding speed of the print-receiving tape 301. For example, when printed at 180 dpi and 20 mm/s, the one printing cycle is a time (approx. 1.7 ms) needed to pass through a 180 dpi printing line interval (approx. 0.14 mm) at 20 mm/s.

Accordingly, when forming a row of dots on the print-receiving tape 301 in its width direction, line printing data for one printing line generated by the control part 530 is transferred to the thermal head 16 so that corresponding heat generating elements are energized based on the transferred line printing data for one printing line. The line printing data for one printing line is printing data for forming a row of dots on the print-receiving tape 301 in its width direction by energizing a row of heat generating elements for one printing cycle. Thus, the heat generating elements energized based on the line printing data for one printing line generate heat up to the ink melt required temperature (e.g. 90° C.) required to melt ink of the ink layer. As a result, ink at a position in contact with the thermal head 16, of the ink layer of the ink ribbon 55 is melted by heating of the thermal head 16. The melted ink of the ink layer is adhered to the print-receiving tape 301, and thereafter the ink ribbon 55 is separated from the print-receiving tape 301 so that only the adhered ink is transferred as one printing line dots to the print-receiving tape 301. The print-receiving tape 301 and the ink ribbon 55 are fed at a proper feeding speed, while the heat transfer process is repeatedly executed for each printing line. A multiplicity of heat generating elements arrayed on the thermal head 16 are selectively and intermittently energized each time, based on printing data for one printing line transferred from the control part 530. As a result, a dot image (text character, etc.) desired by the operator and corresponding to the operator's operation via the operating part 3, etc. is formed as a print R (see FIG. 6 described later) on the print-receiving tape 301.

As described above, in this embodiment, the energization mode of the heat generating elements is sequentially switched for each line printing data, correspondingly to the printing lines of the print-receiving tape 301 passing through positions of the heat generating elements as a result of feeding of the print-receiving tape 301. This enables the thermal head 16 to perform printing at a printing speed commensurate to the feeding speed of the print-receiving tape 301.

<Feature of This Embodiment>

In the tape printer 1 of this embodiment having the basic configuration and operations as described above, a feature of this embodiment lies in a mode of braking control for the motor 402. Details thereof will hereinafter be described in due course.

In general, the DC motor like the motor 402 has the property that it slightly continues to rotate by inertia before the rotation stops, even though deenergized while being rotationally driven through energization. At that time, since the amount of inertia slightly differs due to loads or parts variations specific to each tape printer 1, the amount of feeding caused by the inertial rotation varies, with the result that the print-receiving tape 301 as the generated printed matter may have undesirable variations, i.e., a rear margin 304 (margin appearing further upstream of the upstream end in the transport direction of the print area 302 where print is formed; see FIG. 6 described later) may be relatively large in some cases or, conversely, small in other cases.

<Short Braking and Transistor Circuit>

In order to suppress the above adverse effect, this embodiment performs braking (so-called short brake) short-circuiting the positive electrode and negative electrode of the motor 402. A main configuration in relation to the short brake is shown in FIG. 5.

Referring to FIG. 5, in this embodiment, the positive and negative electrodes of the motor 402 are connected to the motor drive circuit 401 disposed in the drive system 540. On the other hand, the positive and negative electrodes of the motor 402 are connected to a transistor circuit 450 (a short-circuiting device).

Based on control signals from the CPU 400 (an energization control part) included in the control part 530 (details will be described later), the motor drive circuit 401 controls the rotational drive and rotation stop of the motor 402. Based on a control signal from the CPU 400 (a braking control part) (details will be described later), the transistor circuit 450 short-circuits the positive electrode and negative electrode of the motor 402 deenergized under control of the motor drive circuit, for braking (details will be described later).

The transistor circuit 450 includes a PNP transistor Tr1, an NPN transistor Tr2, and four resistors (R1, R2, R3, and R4). The PNP transistor Tr1 has an emitter connected to one (e.g. positive electrode) of positive and negative terminals of the motor 402 and a collector connected to the other (e.g. negative electrode) of the positive and negative terminals of the motor 402. The emitter and a base of the PNP transistor Tr1 are connected via the resistor R1 to each other. On the other hand, the NPN transistor Tr2 has a collector connected via the resistor R2 to the base of the PNP transistor Tr1 and an emitter that is grounded (GND). The resistor R4 is connected in parallel between the emitter and a base of the NPN transistor Tr2. The base of the NPN transistor Tr2 is connected via the resistor R3 to the CPU 400.

<Schematic Behavior on Transport and Print Operation>

As described above, in this embodiment, the above braking is performed upon the transport and print operation when the print-receiving tape 301 is printed while being transported. The schema of this behavior will be described with reference to FIG. 6.

As described above, the platen roller 182 starts the transport of the print-receiving tape 301 when the motor 402 is energized by the motor drive circuit 401 (see FIG. 6), whereas a desired print R (letters "ABCDEFGHIJKLM" in this example) starts to be formed when the heat generating elements of the thermal head 16 are energized by the thermal head drive circuit. Subsequently, the transport of the print-receiving tape 302 stops when the cutter confronts a position CR (corresponding to a desired cutting position; hereinafter, referred to appropriately as "rear end position") of the print-receiving tape 301 where printing of the entire print R is completed on the print area 302 and which is set at a predefined distance (described later) from the upstream end in the transport direction of the print area 302 (whose length, i.e. print length varies in accordance with the content of the print R). Thereafter, the print-receiving tape 301 is cut at the rear end position CR by the cutter blade, so that the printed tape 301 (printed matter) of a desired length is brought to completion (see FIG. 6).

As has already been described, in this embodiment, the cutter blade (not shown) is disposed downstream of the thermal head 16 along the transport direction. As a result, as shown in FIG. 6, a predetermined distance X inevitably exists along the transport direction between the position of the cutter blade and the position of the thermal head 16. As a result, as shown in FIG. 6, the printed tape 301 after completion has a front margin 303 upstream of the print area 302 in the transport direction.

The rear margin 304 is formed downstream of the print area 302 in the transport direction. In this embodiment, the length of the rear margin 304 in the transport direction is controlled to be a fixed length L (regardless of the ambient temperature level). Specifically, the length L of the rear margin 304 is the sum of a free running length La through which the tape freely runs before the short brake is activated and a braking length Lb from the activation of the short brake to the stop of the transport. In this embodiment, the braking length Lb is variably adjusted in accordance with the ambient temperature level so that the length of the rear margin 304 is the fixed length L. Details of the energization control performed therefor will hereinafter be described with reference to FIGS. 7-11.

<At Motor Rotational Drive>

FIG. 7 shows the state where the motor 402 is rotationally driven through energization as described above, with the print-receiving tape 301 being transported. In this case, as shown, a motor drive signal is output from the CPU 400 to the motor drive circuit 401 (in other words, the output signal level to the motor drive circuit 401 is high; see FIG. 10A). That is, the motor 402 is supplied with a motor current from the motor drive circuit 401 (this allows a predetermined motor terminal voltage to be applied across the positive and negative terminals of the motor 402; see FIG. 10B) so that the motor 402 is rotationally driven. At that time, a motor brake signal (described later) is not output from the CPU 400 to the transistor circuit 450 (in other words, the output signal level to the transistor circuit 450 is low; see FIG. 10C). Therefore, the PNP transistor Tr1 and NPN transistor Tr2 of the transistor circuit 450 are both in "OFF" state.

<At Inertial Rotation>

FIG. 8 shows a state where the motor is rotating by inertia (i.e. freely running through the free running length La) after the motor 402 is deenergized as described above. That is, the motor drive signal output from the CPU 400 to the motor drive circuit 401 goes OFF (in other words, the output signal level to the motor drive circuit 401 is low; see FIG. 10A). This prevents the motor current from being supplied from the motor drive circuit 401 to the motor 402, putting the motor 402 in the inertial rotation state as described above. At that time, the motor 402 acts as a generator, allowing a voltage to occur across the terminals (i.e. between the positive and negative electrodes) of the motor 402. At that time, continuously, no motor brake signal is output from the CPU 400 to the transistor circuit 450, and both the PNP transistor Tr1 and NPN transistor Tr2 of the transistor circuit 450 remain OFF.

<At Short Circuiting>

FIG. 9 shows a state where the short brake for the motor 402 is actuated by short circuiting as described above, (in other words, running through the braking length Lb). That is, subsequent to the inertial rotation, the motor brake signal is output from the CPU 400 to the transistor circuit 450 (in other words, the output signal level to the transistor circuit 450 is high; see FIG. 10C). As a result, the PNP transistor Tr1 and NPN transistor Tr2 of the transistor circuit 450 are both turned on. Thus, as shown, a circuit short-circuiting the positive electrode and negative electrode of the motor 402 is formed, allowing a current (brake current; see FIG. 10D) generated during the inertial rotation to flow into the motor 402. As a result, while this brake current occurs, a force opposite to the direction of the inertial rotation is applied so that the motor 402 is braked.

In this embodiment, as shown in FIGS. 10A-10D, in order to prevent the so-called inrush current, short circuiting triggered by sending the motor brake signal is carried out after the elapse of a predetermined wait time tw (e.g. 1 ms) from the deenergization of the motor 402.

<Problem on Braking>

In the case that braking is performed by short-circuiting as described above, it may possibly be affected by the ambient temperature. In the case of a relatively high ambient temperature, the load (in other words, transport resistance) of the entire drive system during the transport of the print-receiving tape 301 is relatively light, whereas in the case of a relatively low ambient temperature, the load (transport resistance) of the entire drive system during the transport of the print-receiving tape 301 becomes heavy. As a result, if certain braking is performed irrespective of the temperature, when the ambient temperature is relatively high, the transport may not be stopped at assumed timing and the rear margin 304 may become longer than expected. On the contrary, when the ambient temperature is relatively low, the transport may be stopped at earlier timing than the assumed timing and the rear margin 304 may become shorter than expected.

<Variable Control Based on Temperature>

Thus, in this embodiment, the CPU 400 controls the transistor circuit 450 in accordance with the temperature detected by the temperature sensor SE so that the operation mode of short-circuiting-based braking is variably controlled. In this example, the timing to start braking is retarded or advanced. Specifically, if the ambient temperature detected by the temperature sensor SE is low, the braking start timing is retarded (in the state where the braking termination timing is fixedly set). Therefore, the free running length La is elongated and the braking length is shortened, while keeping the fixed length L in FIG. 6.

On the contrary, if the temperature detected by the temperature sensor SE is high, the CPU 400 advances the braking start timing (in the state where the braking termination timing is fixedly set). Therefore, the free running length La is shortened and the braking length Lb is elongated, while keeping the fixed length L in FIG. 6.

In this embodiment, the above braking start timing is set such that the braking termination timing (in other words, the braking length Lb) is timing later at least than the inertia stop timing assumed when assuming the case of not performing braking (i.e. when assuming the case of stopping by inertia without short braking, and the CPU 400 performs braking control corresponding thereto.

FIG. 11 shows an example (in other words, correlation between the temperature detected by the temperature sensor SE and the short-circuiting-based braking length Lb) set variously for each of temperature zones of temperatures detected by the temperature sensor SE. In this example, when the detected temperature is less than 10° C., the braking control is performed so that the braking length Lb is 0.705 mm (5 dots in terms of the number of dots described above; the same will apply hereinafter). Similarly, when the detected temperature is 10° C. or more and less than 15° C., the braking control is performed so that the braking length Lb is 0.846 (6 dots in terms of the number of dots described above); when the detected temperature is 15° C. or more and less than 20° C., the braking control is performed so that the braking length Lb is 0.846 (6 dots in terms of the number of dots described above); when the detected temperature is 20° C. or more and less than 25° C., the braking control is performed so that the braking length Lb is 0.987 (7 dots in terms of the number of dots described above); when the detected temperature is 25° C. or more and less than 30° C., the braking control is performed so that the braking length Lb is 0.987 (7 dots in terms of the number of dots described above); when the detected temperature is 30° C. or more and less than 35° C., the braking control is performed so that the braking length Lb is 0.987 (7 dots in terms of the number of dots described above); and when the detected temperature is 35° C. or more, the braking control is performed so that the braking length Lb is 0.987 (7 dots in terms of the number of dots described above). The correlation shown in FIG. 11 is stored in proper memory disposed in the control part 530 for example. The CPU 400 refers to the stored correlation to perform the braking control so as to be able to obtain the braking length Lb corresponding to the temperature zone to which the temperature detected by the temperature sensor SE belongs.

<Advantages of This Embodiment>

As described above, in this embodiment, by controlling the braking length Lb variably in accordance with an ambient temperature detected by the temperature sensor SE, the rear margin 304 can be set to a certain length (the fixed length L) regardless of the level of the ambient temperature.

(1) Case Where Intermittent Number of Times at Intermittent Braking is Adjusted

In this modification example, as another example of variably controlling the operation mode of the short-circuiting-based braking, the continuous braking from the braking start timing (variable) to the braking termination timing (fixed) as in the above embodiment is replaced by intermittent braking from the braking start timing (fixed) to the braking termination timing (fixed), with the intermittent number of times at that time being adjustably increased or decreased. In this example, so-called chopping is applied to the motor brake signal of a rectangular waveform output from the CPU 400 to the transistor 450.

Specifically, if the ambient temperature detected by the temperature sensor SE is low, the CPU 400 (on the presupposition that both the braking start timing and the braking termination timing are fixedly set) increases the number of times of chopping (in other words, the number of times of non-braking period). On the contrary, if the temperature detected by the temperature sensor SE is high, the CPU 400 (on the presupposition that both the braking start timing and the braking termination timing are fixedly set) decreases the number of times of chopping (in other words, the number of times of non-braking period) or does not provide the non-braking period at all.

FIG. 12 corresponding to FIG. 9 of the above embodiment shows time series variations of a motor drive signal, a motor terminal voltage, a brake signal, and a brake current in braking control of this modification example executed when the ambient temperature is 20° C. or more and less than 30° C. In this example, as shown in FIG. 12C, one chopping section CH is disposed and, during this chipping section CH, a motor brake signal output from the CPU 400 to the transistor circuit 450 immediately before and immediately after the chopping section CH is not output (only during this section) (in other words, the output signal level to the transistor circuit 450 goes from high (corresponding to a first level) to low (corresponding to a second level)). The brake current at that time also takes increase and decrease behaviors corresponding to the behaviors of the motor brake signal, as shown in FIG. 12D.

Although not shown, this modification example has, as temperature zones other than the above, three chopping sections CH when the ambient temperature is less than 10° C. and two chopping sections CH when the ambient temperature is 10° C. or more and less than 20° C., with no chopping sections CH when the ambient temperature is 30° C. or more.

FIG. 13 shows a chopping count setting procedure executed by the CPU 400 included in the control part 530 in order to execute the above control.

Referring to FIG. 13, the CPU 400 first determines at step S15 whether the ambient temperature detected by the temperature sensor SE is less than 10° C. If the ambient temperature is 10° C. or more, determination at step S15 becomes negative (step S15: NO), allowing the procedure to shift to step S20 described later. If the ambient temperature is less than 10° C., determination at step S15 becomes affirmative (step S15: YES), allowing the procedure to shift to step S17.

At step S17, the CPU 400 sets the chopping count to 3, to end this flow.

The CPU 400 determines at step S20 whether the ambient temperature detected by the temperature sensor SE is 10° C. or more and less than 20° C. If the ambient temperature is 20° C. or more, determination at step S20 becomes negative (step S20: NO), allowing the procedure to shift to step S25 described later. If the ambient temperature is 10° C. or more and less than 20° C., determination at step S20 becomes affirmative (step S20: YES), allowing the procedure to shift to step S22.

At step S22, the CPU 400 sets the chopping count to 2, to end this flow.

The CPU 400 determines at step S25 whether the ambient temperature detected by the temperature sensor SE is 20° C. or more and less than 30° C. If the ambient temperature is 30° C. or more, determination at step S25 becomes negative (step S25: NO), allowing the procedure to shift to step S30 described later. If the ambient temperature is 20° C. or more and less than 30° C., determination at step S25 becomes affirmative (step S25: YES), allowing the procedure to shift to step S27.

At step S27, the CPU 400 sets the chopping count to 1, to end this flow.

On the other hand, in step S30 to which the procedure shifts as a result of negative determination at step S25, the CPU 400 sets the chopping count to 0 (no chopping), to end this flow.

(2) Others

In the above, arrows shown in FIG. 4 exemplify signal flows and do not intend to limit the directions of signal flows.

The flowchart shown in FIG. 13 does not intend to limit the present disclosure to the procedure designated in the above flow, and addition and deletion of steps or change in the order of steps may be made without departing from the spirit and technical idea of the present disclosure.

Other than those already described above, techniques of the above embodiment and modification examples may appropriately be combined for use.

Although not exemplified one by one, the present disclosure may variously be altered and carried out without departing from the spirit thereof.

What is claimed is:

1. A printer comprising:

a feeder configured to feed a print-receiving medium;

a printing head configured to perform print on a desired print area of said print-receiving medium fed by said feeder;

a DC motor configured to generate a driving force for feeding by said feeder;

an energizing device configured to energize said DC motor;

an energization control part configured to control energization by said energizing device;

a short-circuiting device configured to short-circuit a positive electrode and an negative electrode of said DC motor and brake when deenergized under control of said energization control part for said energizing device;

a temperature detecting device configured to detect a temperature of ambient surroundings; and a braking control part configured to control said short-circuiting device in accordance with the temperature detected by said temperature detecting device, to thereby variably control an operation mode of said braking by said short circuiting.

2. The printer according to claim 1, further comprising a cutter configured to cut said print-receiving medium on which printing has been performed by said printing head, disposed downstream of said printing head in a direction of said feeding, wherein:

said short-circuiting device is configured to perform said short-circuiting and said braking after termination of printing on said print area by said printing head, so as to allow said cutter to face a desired cutting position lying upstream of said print area in said feeding direction on said print-receiving medium, and said braking control part is configured to control said short-circuiting device so as to set a length from an upstream end of said print area in said feeding direction on said print-receiving medium to said cutting position to a substantially constant value.

3. The printer according to claim 2, wherein:

said short-circuiting device is configured to continuously perform said braking from braking start timing that is variably set to braking termination timing that is fixedly set, and said braking control part is configured to retard said braking start timing when said detected temperature is low and to advance said braking start timing when said detected temperature is high.

4. The printer according to claim 3, wherein said braking termination timing is later than at least inertia stop timing at which said print-receiving tape stops by inertia when assuming that said braking is not performed.

5. The printer according to claim 2, wherein:

said short-circuiting device is configured to intermittently perform said braking from braking start timing that is fixedly set to braking termination timing that is fixedly set, and said braking control part is configured to increase the number of times of a non-braking period during the braking intermittently performed when said detected temperature is low, and is configured to decrease the number of times of said non-braking period or not to provide said non-braking period when said detected temperature is high.

6. The printer according to claim 5, wherein:

said short-circuiting device is configured to input a rectangular-wave signal having a first level and a second level, to thereby perform said short circuiting at timing when said rectangular-wave signal is at said first level, and said braking control part is configured to increase the number of times by which said rectangular-wave signal goes to said second level when said detected temperature is low, and is configured to decrease the number of times by which said rectangular-wave signal goes to said second level or to prevent said rectangular-wave signal from going to said second level when said detected temperature is high.

7. The printer according to claim 1, wherein said braking control part is configured to control said short-circuiting device so as to perform said short circuiting after a predetermined wait time from deenergization by said energization control part has lapsed.

8. The printer according to claim 1, further comprising a memory storing a correlation between a braking length by means of short circuiting by said short-circuiting device and a temperature detected by said temperature detecting device, wherein said braking control part is configured to refer to said correlation stored in said memory to control said short-circuiting device so as to obtain said braking length in accordance with the temperature detected by said temperature detecting device.

* * * * *